March 4, 1930.  W. STROHMEIER  1,749,196
SELF ADJUSTING SHAFT BEARING
Filed June 17, 1929
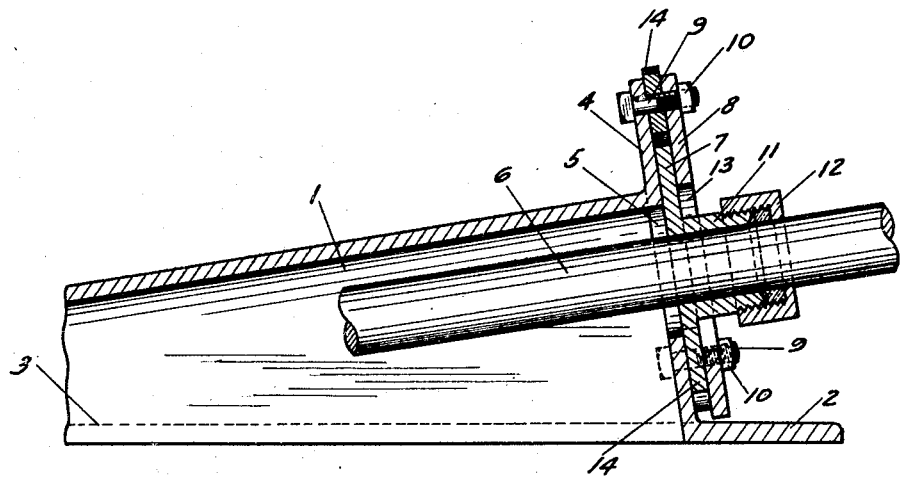
FIG-1
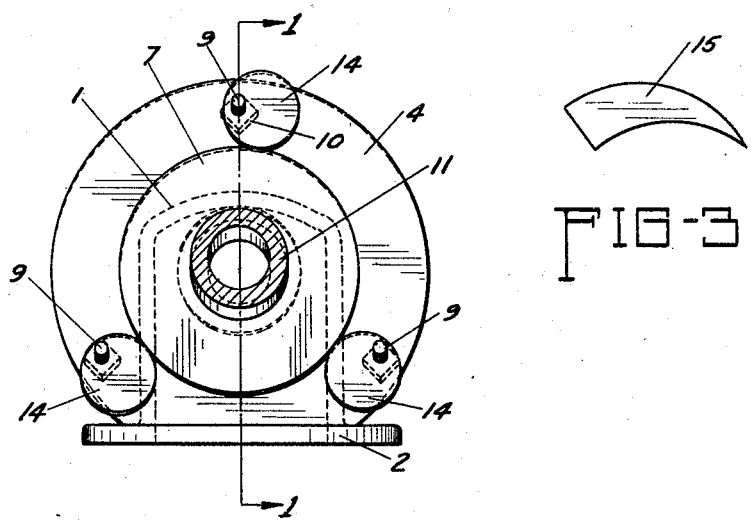
FIG-2
FIG-3
INVENTOR.
William Strohmeier.
BY Walter N. Haskell.
his ATTORNEY Patented Mar. 4, 1930

1,749,196

UNITED STATES PATENT OFFICE

WILLIAM STROHMEIER, OF ANDALUSIA, ILLINOIS

SELF-ADJUSTING SHAFT BEARING

Application filed June 17, 1929. Serial No. 371,552.

My invention has reference to a self-adjusting shaft bearing, and relates more specially to means for supporting the shaft of a motor boat, of that type in which the shaft extends in an inclined position through the floor of a boat. It sometimes occurs that the motor is improperly set in the boat, or gets out of position, as a result of which there is a strain on the shaft until the fault is corrected. One of the purposes of the present invention is to provide a simple and effective means for relieving the strain on the shaft, so that it will adjust itself to a position conforming with that of the motor.

Another object of the invention is to provide a means for fixing the shaft in adjusted position, so that the same will not be affected by vibration of the shaft, or other accidental cause. This means also serves as a preventive of breakage of some of the parts due to excessive stress thereon in securing the same in place.

The above named, and other features and advantages of the invention will more fully appear from the following specification, reference being had to the accompanying drawings, in which:

Fig. 1 is a fragmentary longitudinal section on the broken line 1—1 of Fig. 2, of a casing equipped with the invention.

Fig. 2 is an end view of the invention with the plate 8 removed.

Fig. 3 is a detail of a wedge-key 15.

The reference number 1 indicates a casing of tapering form, provided with flanges 2 and 3 for attachment to the bottom of a motor boat, at the larger end of which casing, or "water-log", is a head 4, having an opening 5 for the passage of the diagonally set shaft 6. A circular plate 7 is held between the head 4 and a larger plate 8 by means of bolts 9 and nuts 10 on the threaded ends thereof. Projected outwardly from the plate 7 is a bearing 11, on the outer end of which is a stuffing-box 12, to prevent outward escape of water in the casing 1. Lateral movement of the bearing 11 in any direction is permitted by an opening 13 in the plate 8, of greater diameter than the opening 5. The latter opening provides for a similar movement of the shaft 6.

Having an eccentric connection with the bolts 9 are circular stops or keys 14, which bear against the edge of the plate 7, and are clamped tightly between the head 4 and plate 8, preventing any casual movement of the plate 7 or shaft 6 after adjustment thereof. Said stops also act as spacers between the head 4 and plate 8, preventing the same from being drawn toward each other in setting the bolts as to cause cracking or breakage thereof.

In case of the shaft 6 being out of proper alignment the nuts 10 are loosened a little, whereupon the plate 7 and shaft 6 adjust themselves to the true position, after which the stops 14 are set against the edge of the plate 7, and the nuts again tightened. Any necessary change in the position of the shaft can thus be quickly made.

In Fig. 3 is shown a wedge-key 15 of curved form, the inner curve of which conforms to that of the plate 7, and which can be used as a substitute for one or more of the stops 14, the wedge-key being forced in between the bolt 9 and edge of the plate 7, and then clamped between the head 4 and plate 8 as in the case of the stop.

What I claim, and desire to secure by Letters Patent, is:

1. In combination with a shaft casing and head therefor, provided with an opening permitting a universal lateral movement of a shaft passing therethrough, a relatively small plate and shaft bearing projected outwardly therefrom, a clamp-plate connected with said head, provided with an opening permitting free lateral movement of said shaft bearing, and radially adjustable stops on opposite sides of said small plate, of equal thickness therewith.

2. In a device of the class described, a pair of clamp-plates, a shaft-bearing and plate connected therewith, adapted to be held rigidly between said clamp-plates, said clamp-plates being provided with openings permitting a free lateral movement of a shaft passing therethrough, fastening devices at the outer edge of said clamp-plates, and eccentrically operative key members interposed between said fastening devices and said shaft-bearing plate, locking said plate from lateral movement.

3. In a device of the class described, a stationary plate having a central shaft opening permitting free lateral movement of a shaft passing therethrough, a relatively small plate and shaft bearing integral therewith, a clamp plate similar to the stationary plate, and having a central shaft opening permitting free lateral movement of a shaft passing therethrough, bolts securing said stationary and clamp plates to each other near their outer edges, and eccentrically mounted stops on said bolts of substantially the same thickness as said small plate.

In testimony whereof I affix my signature.

WILLIAM STROHMEIER.